(12) United States Patent
He et al.

(10) Patent No.: US 7,566,004 B2
(45) Date of Patent: *Jul. 28, 2009

(54) METHOD AND APPARATUS FOR EXTENDING THE RANGE OF A PRODUCT AUTHENTICATION DEVICE

(75) Inventors: Duanfeng He, South Setauket, NY (US); Eugene Joseph, Coram, NY (US)

(73) Assignee: Symbol Technologies Inc., Holtsville, NY (US)

( * ) Notice: Subject to any disclaimer, the term of this patent is extended or adjusted under 35 U.S.C. 154(b) by 589 days.

This patent is subject to a terminal disclaimer.

(21) Appl. No.: 11/229,253

(22) Filed: Sep. 16, 2005

(65) Prior Publication Data

US 2006/0091221 A1    May 4, 2006

Related U.S. Application Data

(63) Continuation-in-part of application No. 11/140,794, filed on May 31, 2005, now Pat. No. 7,309,011, and a continuation-in-part of application No. 11/039,682, filed on Jan. 19, 2005, now Pat. No. 7,364,074, and a continuation-in-part of application No. 10/977,597, filed on Oct. 29, 2004.

(51) Int. Cl.
*G06F 19/00* (2006.01)
(52) U.S. Cl. .................. 235/385; 235/383; 235/462.01
(58) Field of Classification Search ............ 235/462.01, 235/470, 487, 462.11, 436, 383, 385, 472.01
See application file for complete search history.

(56) References Cited

U.S. PATENT DOCUMENTS

| | | | | |
|---|---|---|---|---|
| 5,777,310 A | * | 7/1998 | Liu et al. ............... | 235/462.12 |
| 6,226,619 B1 | * | 5/2001 | Halperin et al. ................ | 705/1 |
| 6,343,695 B1 | * | 2/2002 | Petrick et al. ............... | 206/534 |
| 7,162,035 B1 | * | 1/2007 | Durst et al. .................... | 380/54 |
| 7,204,421 B2 | * | 4/2007 | Austin .................... | 235/462.01 |
| 7,309,011 B2 | * | 12/2007 | He ............................. | 235/385 |
| 7,322,514 B2 | * | 1/2008 | Lubow ....................... | 235/375 |
| 7,364,074 B2 | * | 4/2008 | He et al. ..................... | 235/385 |
| 7,379,613 B2 | * | 5/2008 | Dowski et al. .............. | 382/255 |
| 2002/0024215 A1 | * | 2/2002 | Wong ........................... | 283/72 |
| 2002/0170966 A1 | * | 11/2002 | Hannigan et al. ...... | 235/462.01 |
| 2003/0210805 A1 | | 11/2003 | Lofgren et al. | |

OTHER PUBLICATIONS

International Search Report for PCT International Application No. PCT/US06/020354, Feb. 9, 2007, Symbol Technologies, Inc.
Symbol Technologies, Inc., Electronic Track & Trace—An Immediate Solution, journal, Nov. 2003, pp. 1-16, Symbol Technologies, Inc.

* cited by examiner

*Primary Examiner*—Seung H Lee

(57) ABSTRACT

A method of identifying or authenticating a product by providing an analog identification indicium including a randomized pattern of identification features on a first part of the product wherein one or more attributes of the randomized pattern of identification features correspond to an item identifier. A digital identification record is provided on a second part of the product including an encoded digital version of the item identifier, the first and second parts being separable when the product is used. The randomized pattern of identification features of the analog identification indicium is read and decoded to generate an item identifier and the digital identification record is read and decoded to generate an item identifier. A blur analysis is performed on the analog identification indicium and the amount of blur is compensated for during processing. The product is deemed authentic if the item identifier from the analog identification indicium substantially matches the item identifier from the digital identification record.

35 Claims, 7 Drawing Sheets

METHOD AND APPARATUS FOR EXTENDING THE RANGE OF A PRODUCT AUTHENTICATION DEVICE

CROSS-REFERENCE TO RELATED APPLICATION

The present invention is a continuation in part of U.S. application Ser. No. 11/140,794 filed on May 31, 2005 and entitled "Method of Authenticating Products Using Hardware Compatibility Flag" which is a continuation-in-part of U.S. application Ser. No. 11/039,682 filed on Jan. 19, 2005 and entitled "Method of Authenticating Products Using Analog and Digital Identifiers" which is a continuation-in-part of U.S. application Ser. No. 10/977,597, filed on Oct. 29, 2004 and entitled "Analog and Digital Indicia Authentication." The '597, '682, and '794 applications are incorporated herein in their entirety by reference.

FIELD OF THE INVENTION

The present invention relates to a system and method of authenticating a product using a combination of analog and digital identifiers including an analog identification indicium and a corresponding digital identification record and, more specifically, to a system and method for extending the working range of a device that authenticates such a product.

BACKGROUND

There is an increasing concern over counterfeit products including software, music CDs, and over-the-counter and prescription drugs entering the U.S. market. Counterfeit products not only depress profits of legitimate manufactures, but consumers who unknowingly purchase counterfeit products are being misled. Because of health issues involving counterfeit drugs, this is a paramount concern of drug manufacturers and governmental agencies. The concern is exacerbated because of the ready availability of lower cost prescription drugs from Internet pharmacies and drug stores with undisclosed sources for the product they provide.

Because of governmental regulations and/or to prevent unauthorized tampering, many prescription and over-the-counter drugs are packaged in containers using tamper-resistant seals. The consumer purchasing a drug product must break or destroy the tamper-resistant seal in order to open the container and access the product. While such tamper-resistant seals effectively thwart tampering, sophisticated counterfeit drug manufacturers may manufacture containers that include a tamper-resistant seal. Thus, tamper-resistant seals do not adequately address the issue of counterfeit drugs.

Many other anti-counterfeit measures have been developed for use with other products that been prime targets for counterfeiters such as checks, CDs and DVDs. These anti-counterfeit measures attempt to prevent a counterfeit manufacturer from easily reproducing labels that bear anti-counterfeit indicium. For example, companies such as Microsoft Corporation use holograms on the packages of their software to indicate authenticity. Escher Group of Cambridge, Massachusetts has developed a FiberFingerprint™ technology that can identify a piece of paper by its natural and unique fiber patterns. This enables the capability to identify a piece of paper in a way similar to identifying people through fingerprints. Tracer Technologies of Syosset, N.Y. has developed a fluorescent micro-fiber detection technology for security. The micro-fibers are randomly embedded in a plastic material which are only revealed upon illumination by UV light. AMCO of Farmingdale, N.Y. has developed visible as well as fluorescent tags that can be embedded in plastics. Other pigments that can be imbedded in an anti-counterfeit label or in a product have the capability of changing color when viewed at different angles. Such a color-changing pigment is also present in certain denominations of newly printed U.S. currency.

These anti-counterfeiting technologies make it difficult to reproduce the anti-counterfeit label component using copying or scanning techniques. However, more sophisticated counterfeiters have been known to make the investment necessary to duplicate these anti-counterfeit measures. For example, the holographic labels such as those used by Microsoft Corporation are known to have been successfully counterfeited.

While anti-counterfeiting technologies, such as those disclosed in the parent '597, '682, and '794 applications, provide an additional measure of security, processing of the analog identification indicium on the product label is relatively sensitive to the distance between the scanner and the indicium while processing of the 2-D barcode portion of the product label has a greater working range.

SUMMARY

A product is authenticated that includes an analog identification indicium comprising a pattern of identification features that correspond to an item identifier and a digital identification record including a digitized version of the analog identification indicium. A potentially blurred image of the analog identification indicium is captured and analyzed, compensating for blurring of the analog identification indicium, to determine the item identifier corresponding to the pattern of identification features. The item identifier determined from the image the analog identification indicium is compared to the item identifier determined from the digital identification record.

One way to compensate for the blurring of the analog identification indicium is by quantizing the analog identification indicium into a few levels of contrast or by binarizing the analog identification indicium. Alternatively, a deblurring filter can be constructed and applied to the analog identification indicium.

The analog identification indicium may advantageously include a blur analysis target. In this case the level of blurring of the analog identification indicium is determined by analyzing the blur analysis target to construct a blur kernel that can be used to compensate for the blurred image of the analog identification indicium presently being analyzed. An idealized step waveform is formed representing light reflected back from a scan of an unblurred blur analysis target edge. The idealized step waveform includes a first level corresponding to a level of contrast of a background of the analog identification indicium and a second level corresponding to the determined level of contrast of the center location of the blur analysis target. A line of pixels is scanned through the center of the blur analysis target and a blurred step waveform is formed representing the light reflected back from the line. A one-dimensional line-spread function is formed utilizing the level differential between the idealized step waveform and a derivative of the blurred step waveform as a function of position. The line-spread function is transformed into a two-dimensional blur kernel based on an assumption that the blur kernel is rotationally symmetrical.

Once the blur kernel is derived, the blurring of the analog identification indicium can be compensated for by inverting the blur kernel and applying it to the blurred analog identification indicium. Alternatively the blur kernel is applied to a template that is an image of the analog identification indicium constructed from the encoded digital version of the item identifier. The item identifier derived from the blurred template is compared with an item identifier obtained from the blurred analog identification indicium. If a level of blur is determined to be excessive, further processing can be inhibited and an excessive blur alert can be triggered to alert a user to this fact.

These and other objects, advantages, and features of the exemplary embodiment of the invention are described in detail in conjunction with the accompanying drawings.

DETAILED DESCRIPTION

Figure 1:
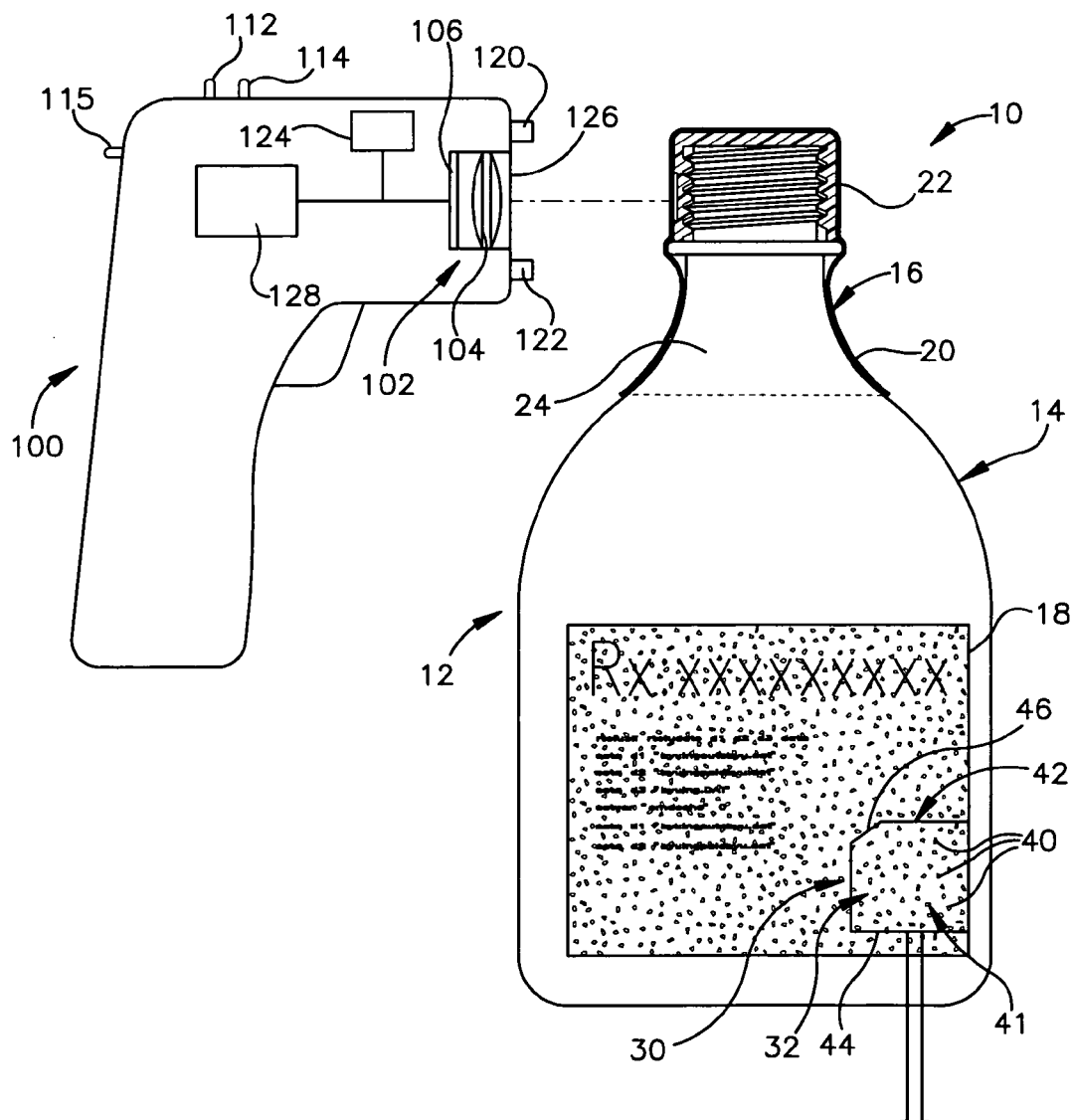
FIG. 1 is a schematic representation of a product authentication/identification system including a reader capable of imaging and decoding both analog and digital identification indicia and a product including an analog identification indicium embedded in a container label of the product and a digital identification indicium included in a 2D bar code imprinted on a tamper-resistant seal of the product.
Figure 2:
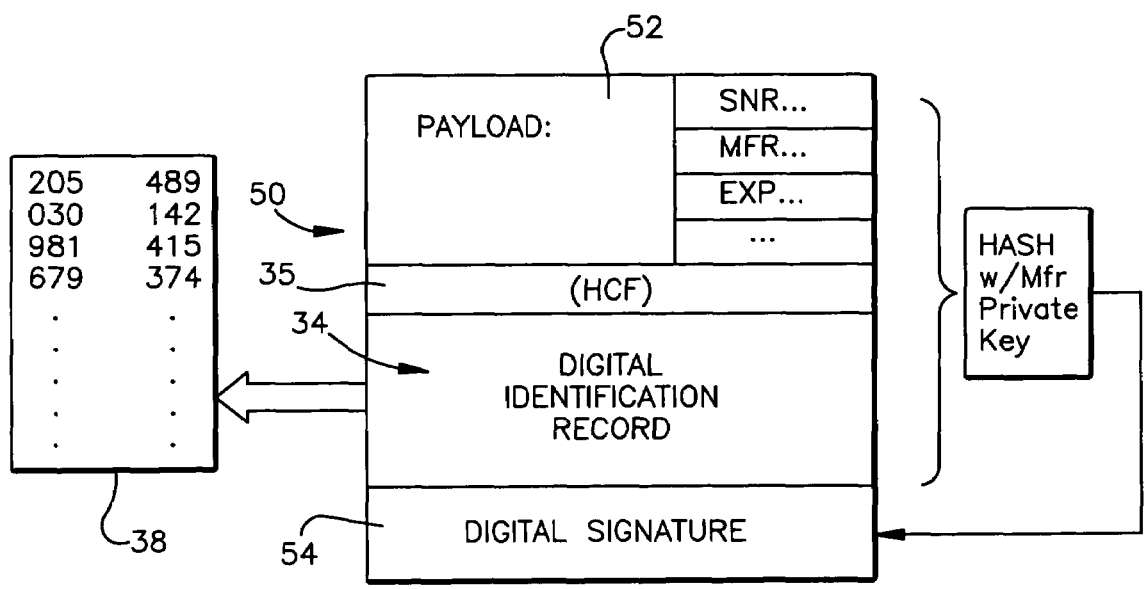
FIG. 2 is a schematic illustration of information encoded in the 2D bar code of FIG. 1 including the digital identification indicium.

One preferred embodiment of the identification or authentication system of the present invention is shown generally at 10 in FIGS. 1 and 2. The system 10 provides a straightforward way of authenticating a product 12 using a two component authentication identifier 30, the two components being attached to separable parts of the product 12. The system also includes a reader device 100 adapted to read and decode both components of the authentication identifier 30.

Figure 1A:
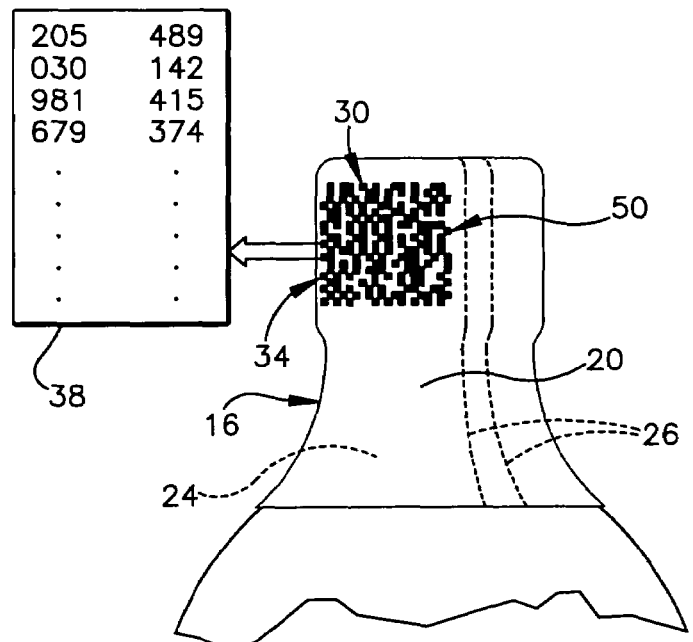
FIG. 1A is a schematic elevation view of the wrapped seal of FIG. 1.

The product 12 includes a container 14 that holds, for example, prescription medication in the form of tablets, capsules or liquid. The product container 14 includes a tamper-resistant seal 16 and a product label 18. As shown in FIGS. 1 and 1A, the seal 16 may be a plastic wrap 20 that tightly overlies a cap or top 22 of the container 14 and a shoulder portion 24 of the container below the cap 22. Typically, the seal wrap 20 includes one or more vertical lines of weakness 26 that allow a consumer to more easily remove the wrap 20 from container 14.

The product 12 includes the authentication identifier 30 which has two components: an analog identification indicium 32 and a digital identifier or indicium such as a digital identifier record 34. The analog identification indicium 32 and the digital identification record 34 (FIG. 1A) are applied or affixed to separable parts of the product 12. The analog identification indicium 32 is embodied in a random pattern 41 of identification features 40 within an area of interest 42. The digital identification record 34 is embodied in a digital pattern of a portion of a 2D bar code 50. The analog identification indicium 32, when decoded, generates an item identifier 36. Similarly, the digital identification record 34, when decoded, generates an item identifier 38. The "(HCF)" 35 that is shown as part of the 2D bar code 50 is an optional digital identification record hardware compatibility flag which will be discussed in detail below.

If a comparison of the patterns comprising the item identifiers 36, 38 indicates that they match, that is, they are similar within predetermine tolerances, the product 12 is deemed authentic. During manufacture of the product 12, the item identifier 36 generated from the analog identification indicium 32 is used to encode the digital identification record 34, therefore, the item identifiers 36, 38 should be identical. However, when subsequently authenticating the product 12 in the field, the reading and decoding of the analog identification indicium 32 is prone to error because many variables that may affect the quality of the imaging and, thus, the decoded item identifier 36 may be slightly influenced by the angle and distance of the reader device 100 from the pattern 41, the illumination level, contaminants on or damage of the area of interest 42 of the product 12, etc. On the other hand, because of error-correction techniques generally built into the 2D bar code 50, the reader device 100 generally can accurately decode the bar code 50. Thus, even if the product 12 is authentic, the item identifiers 36, 38 are unlikely to match exactly. Rather, the geometrical patterns represented by the item identifiers 36, 38 are compared and if they are within predetermined tolerance limits, the product 12 is deemed authentic.

More specifically, the analog identification indicium 32, when decoded, corresponds to or generates a sequence of numerical values referred to as the item identifier or signature 36. The numerical values of the item identifier 36 may, for example, correspond to Cartesian (x & y) coordinates of some or all of the identification features 40 within the area of interest 42 and/or reflected or emitted light intensity values of some or all of the imaged features 40 and/or color values of some or all of the imaged features 40 and/or other attributes of the random pattern 41. The sequence of numbers corresponding to the item identifier 36 of the analog identification indicium 32 is encoded into the digital identification record 34 of the product 12.

Advantageously, the two components of the authentication identifiers 30 are disposed on separable parts of the product 12. For example, the analog identification indicium 32 may be incorporated into the product label 18, while the digital identification record 34 may be incorporated into the tamper-resistant seal wrap 20. In this way, when the product 12 is opened for use by a purchaser, the components 32, 34 of the authentication identifier 30 are separated thereby removing the connection between the components and preventing their reuse.

Further, upon first opening of the product container 14, the digital identification record 34 incorporated in the seal wrap 20 is destroyed, preventing, for example, refilling the container 14 with counterfeit tablets, capsules or liquid and reselling the product 12.

The identification and authentication system 10 further includes the reader device 100, such as an imaging-based bar code reader or scanner capable of reading and decoding both the analog identification indicium 32 and the digital identification indicium 34. Generally, imaging-based bar code readers or scanners include an imaging system 102 that utilizes an imaging array such as a CCD array or a CMOS array having a plurality of photosensitive elements or pixels.

Light reflected or emitted from a target image, e.g., a target bar code imprinted on a product label or product packaging within a field of view of the imaging system 102, is focused through a lens 104 of the imaging system onto a pixel array 106. Output signals from the pixels of the pixel array are digitized by an analog-to-digital converter 108. Decoding circuitry 110 of the device 100 processes the digitized signals and attempts to decode the imaged target, e.g., the imaged target bar code. While the shapes and relative sizes of the analog and digital identification identifiers 32, 34 are arbitrary, it is advantageous to select relative sizes that may be successfully imaged by the optics of the same reader 100 without the need for changing magnification or zooming.

One method of determining product authenticity is to use reader device 100 to read and decode the analog identification indicium 32 and the digital identification record 34. If the two identification identifiers 32, 34 generate the same or substantially the same item identifiers 36, 38, the product 12 is determined to be authentic and a positive audio and/or visual feedback may be provided to the operator of the reader 100, e.g., illumination of a pair of green LEDs 112, 114 and/or an audible "beep" from a speaker 113 to indicate an authentic product. As noted above, because of the variability inherent in imaging in the field as well as contaminants and damage to the product 12 (e.g., scratches on the product label 18 and/or seal 20), it is likely that the pattern of numbers representing the item identifiers 36, 38 will not match exactly. For example, when imaging the random pattern 41 comprising the analog identification indicium 32, one or more of the identification features 40 is "missed," that is, not successfully imaged and decoded, the resulting pattern of numbers representing the item identifier 36 will necessarily be different than the pattern of numbers representing the item identifier 38 decoded from the 2D bar code 50.

Depending on the nature of the product and the desired level of security, a substantial matching, that is, some predetermined level of matching less than 100% matching of the compared patterns comprising the item identifiers 36, 38 will be deemed sufficient to determine the product 12 is authentic.

This method of authentication has the advantage of being a "stand alone" method of authentication that can be performed in the field without the necessity of communicating with a remote database. If desired, however, information from the authentication process may be communicated to a central database to permit tracing and tracking of the product 12 through its distribution system from manufacturer to consumer. The transmission of information regarding the product 12 to a central database may also include a product serial number (encoded in a payload 52 of the 2D bar code 50), the time and place that the authentication occurred, an identification number of the reader device 100, an identification number of the user/company authorized to use the reader device 100.

Analog Identification Indicium 32

Embedded in the label 18 is the analog identification indicium 32 comprising the random identification pattern 41. The pattern 41 includes a plurality of spaced apart identification features 40 within the area or region of interest 42 of the label 18. To facilitate reading the region of interest 42, the region of interest 42 may be marked with an identification mark in the form of a border or outline 44, visible under normal ambient light, to define the region of interest 42 (FIG. 1A). Right angled portions of the border or outline 44 may advantageously be used as the coordinate axes for calculating the x & y coordinates of the features 40, the x & y coordinate values being part of the item identifier 36.

The identification features 40 preferably are embedded in the material that the label 18 is fabricated from. The features 40, for example, may be one or more types of colored particles distributed in a random pattern. Some or all of the colored particles may be color-shifting particles such that the particles respond in a predictable way under illumination of a given wavelength, for example, the features 40 may be color-shifting such that they are visible in the presence of UV or infrared light, but nearly invisible when illuminated with visible light. One color-shifting characteristic that can be used is fluorescence, which generally refers to the excitation of visible light by means of invisible illumination.

The use of color-shifting features prevents the use of photocopiers or scanners to reproduce the label 18. The use of colored features 40 advantageously allows batches of label material to be produced in a normal process of making certain film or paper-like materials wherein the features would be randomly mixed in and survive intact throughout the remaining process. One benefit of using color-shifting material is that the influence of post-production disfigurations and contaminations (such as pieces of dirt or dust), which are not normally color-shifting themselves, is reduced. Such disfigurations can be detected by comparing an image taken with UV or infrared light to one taken with visible light.

The analog identification features 40 are demarcated by the outline 44 such that, while the colored particles may be located throughout the label 28, only the demarcated area or region of interest 42 is processed by reader 100 to read the analog identification indicium 32. Alternatively, the identification pattern 41 may be printed on the label material using a conventional printing process provided that the features 40 are random and, therefore, would change from label to label such that each analog identification indicium 32 would generate a unique product identifier 36.

The analog identification indicium 32 preferably includes an orientation feature 46 to indicate to the reader 100 how the analog identification features 40 should be parsed in order to match the reading orientation used for generating the digital identification record 34 and to successfully read and decode the analog identification indicium 32. Alternately, the analog identification indicium 32 may be of a type that does not require an orientation feature for successful reading and decoding. An example of such an analog identification indicium comprising a random pattern of identification features in the form of particles imbedded in a tamper-resistant seal or cap of a container is disclosed in U.S. application Ser. No. 10/974,644, filed on Oct. 27, 2004 and entitled "Method of Identifying and Authenticating Products Using an Identification Pattern and Bar Code Reader." The '644 application is assigned to the assignee of the present invention and is incorporated herein in its entirety by reference.

Any other randomly generated pattern that is difficult to reproduce using conventional methods may be used as the analog identification indicium 32. The random pattern of features 40 can be generated such that the features produce a unique identifier or signature for each indicium that would rarely, if ever, be reproduced in a like indicium. The randomness increases the likelihood of detection of strictly duplicated analog identification features. The randomness can be derived from a variety of factors, such as the location, size, or color of the features and if the features are long, such as fibers, the orientation of the fibers as well can be used to derive randomness.

The indicia reader 100 reads the analog identification indicium 32 and using a mathematical algorithm and/or decision rules determines the item identifier 36, that is, a numerical representation of some quality of the analog identification feature. For example, the identifier 36 may be a collection of data describing the identifiable features in the analog identification feature, such as the x-y coordinates of all or a predetermined number of features 40.

Digital Identification Record 34

In the manufacturing of the product label 18, a unique analog identification indicium 32 in the form of a random identification pattern 41 in a region of interest 42 is generated as described above. The analog identification indicium 32, when decoded by the reader 100, generates or is transformed into the unique item identifier 36. During the manufacturing process, the item identifier 36 is then encoded to generate the digital identification record 34 which is attached to or imprinted on the product 12 for subsequent authentication. The digital identification record 34 preferably is encoded in a portion of the 2D bar code 50, such as a DataMatrix bar code.

The item identifier 36 may also be stored in a memory 124 of the reader 100. The reader memory 124 may include a file of authentic item identifiers. A record of recently read signatures, or their representations, such as hashes, may be advantageously stored for comparison to the signature currently being processed to detect duplication of a random pattern among labels in the same batch of product.

FIG. 2 is a schematic representation of the 2D bar code 50. The bar code 50 is digital, that is, the presence or absence of a dark area or cell is representative of a zero or one. The bar code 50 includes three encoded fields or parts: the payload 52, the digital identification record 34 which includes the encoded item identifier 38, and a digital signature 54. The data encoded in the bar code 50 is generally not encrypted, but advantageously uses error-correction to protect the reading integrity of the information it carries. Identifiers usually identify each individual field or groups of fields according to given industrial standards.

The payload 52 encodes the manufacturer's identifying and specifying information and typically includes some or all of the following information: UPC/EAN number, manufacturer, part number, lot number, serial number, and expiration date. This portion of the bar code 50 can be read and processed by standard bar code scanners or readers in those situations where authentication is deemed unnecessary.

The digital identification record 34 is tagged with an identifier similar to those used for the payload information. Encoding the digital signature 54 in the bar code 50 utilizes a technology that is widely available in e-commerce and in almost every web browser. The National Institute of Standards and Technology (www.nist.gov) maintains a standard version, which is available at no cost. As shown in FIG. 2, the digital signature is a one-way hash of the message to which the signature is attached. In this case, the message is the information from the previous two subsections (payload 52 and digital identification record 34). The field identifiers themselves could be included as part of the message. The presence of the digital signature 54 vouches for the authenticity of the information that is used to create the signature. The signer possesses a unique number for generating the one-way hash, which is generally referred to as the secret or private key. A published related number, that is, a public key is used to verify that the digital signature 54 matches the message.

Indicia Reader 100

The indicia reader shown in FIG. 1 is a hand-held imaging-based scanner or reader. However the invention can be applied to stationary readers and laser scanners as well. Utilizing its imaging system 102 and bar code decoding circuitry 110, the reader 100 may be used both to image and decode the 2D bar code 50 imprinted on a label 18 to obtain certain information and for inventory control purposes and to authenticate the product 12 by imaging and decoding the analog identification indicium 32 and comparing the item identifier 36 derived from the indicium 32 with the item identifier 38 embedded in the digital identification record 34 of the 2D bar code 50. The reader 100 images the 2D bar code 50 and decodes the digital identification record 34 to obtain the item identifier 38.

For the decoding of the analog identification pattern 41, the reader 100 includes additional pattern decoding circuitry 116, embodied either in software or hardware, such that when the label 18 area of interest 42 is imaged by the reader 100, the pattern decoding circuitry 116 analyzes the captured image, locates and identifies the analog identification indicium 32 by the shape of its outline 44, identifies the region of interest 42 and the identification features or particles 40 within it, ascertains the identification pattern 41 and determines the item identifier 36 for the product 12. The item identifiers 36, 38 are compared by comparison circuitry 118 of the reader 100 to decide if the identifiers 36, 38 are similar enough to conclude the product 12 is authentic.

Since it is desired that the reader 100 be able to image and decode both an identification pattern 41 that includes particles 40 that color shift under UV illumination and a 2D bar code 50, it is necessary that the reader provide both visible illumination and illumination in the ultraviolet (UV) range. Additional opto-electrical components may also be desired to form an aiming pattern corresponding to a field of view of the imaging assembly 102. The visible illumination is preferably provided in the form of an array of visible LEDs 120 and the UV illumination is preferably provided in the form of an array of UV LEDs and/or one or more UV lasers 122. Providing a UV laser 122 instead of or in addition to UV LEDs increases the intensity of the excitation UV light directed at the fluorescent particles 40. This, in turn, causes the emitted fluorescent light to be of greater intensity and, therefore, more likely to produce a decodable image.

Figure 3:
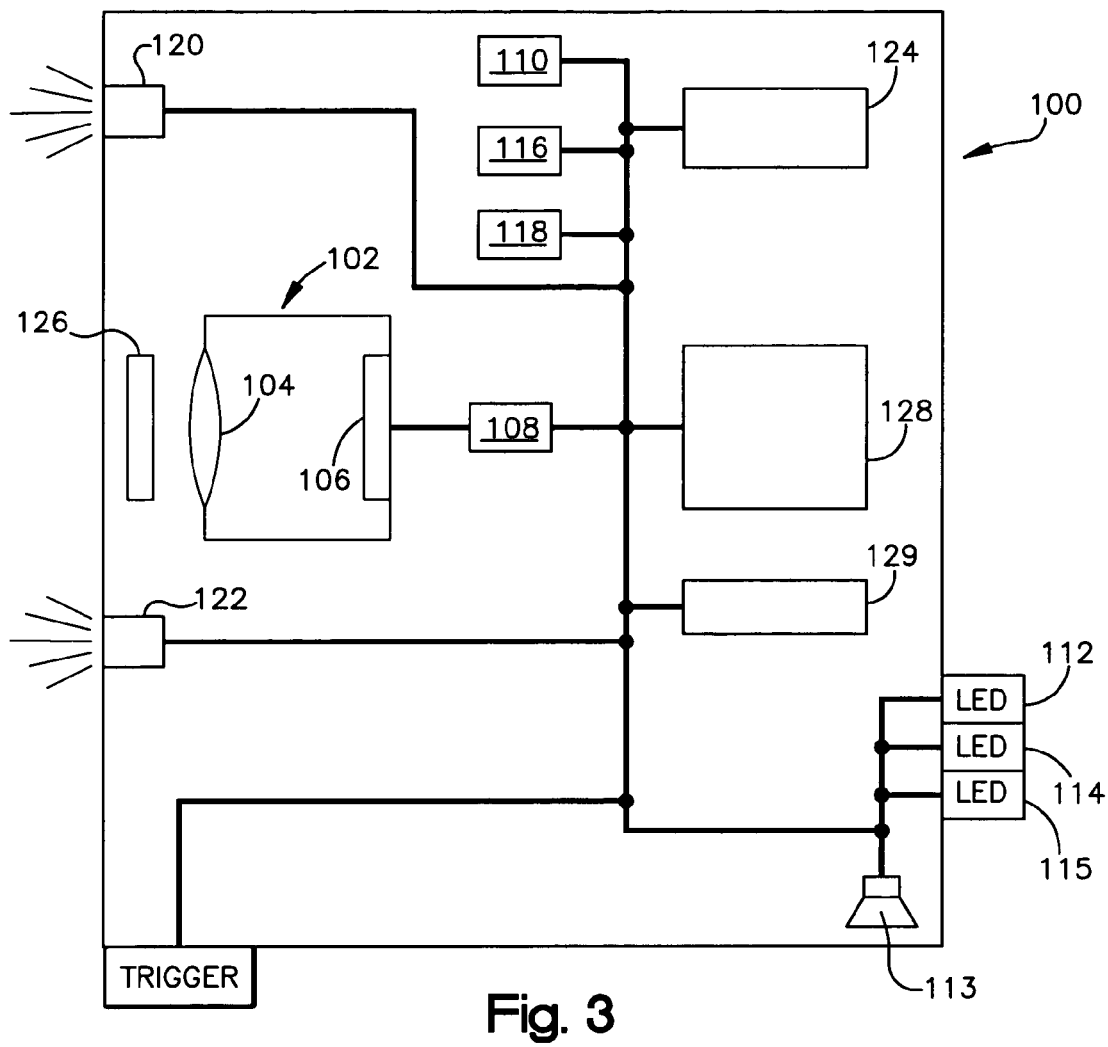
FIG. 3 is a schematic illustration of a reader capable of imaging and decoding both analog and digital identification indicia.
Figure 6A:
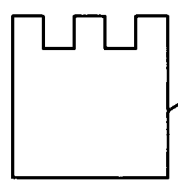
FIGS. 6A-6D show analog indicium outline patterns that can be used to implement hardware compatibility flags in accordance with an embodiment of the present invention.
Figure 6B:
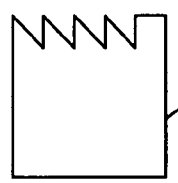
Figure 6C:
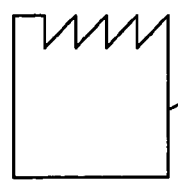
Figure 6D:
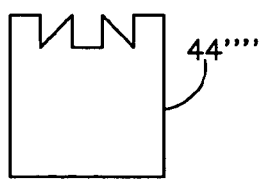

If the analog identification feature includes color-shifting fibers, a specialized imaging system 102 such as that shown in FIG. 3 is required to detect the color-shifting fibers. The imaging system 102 includes the lens 104 and the sensor 106 (such as a CCD or CMOS 2-D array sensor), a narrow band block filter 126 that is in the reflected light path of the lens 104, positioned either in front of or behind the lens, one or more visible LEDs 120, one or more UV LEDs and/or UV laser 122, a micro-processor 128, the on board memory 124, which may contain a database of public keys, and interface and support circuits 129. The interface and support circuits 129 may have wired and/or wireless communications means to a host computer or a network. It may also contain an onboard battery (not shown), and/or connections for an external power supply (not shown).

The narrow band block filter 126 has a pass band that is chosen to match that of the fluorescent light emitted by the identification features 40. In addition, it also matches that of the visible LEDs 120. This is possible because there are different fluorescent materials that fluorescence in different wavelengths. And likewise, there are different LEDs that emit light in different wavelengths. By choosing a suitable fluorescent material and a type of LED that have common wavelengths, the filter 126 can be constructed with a pass band that can allow both the light of the LEDs 120 and the fluorescence of the features 40 to pass through. Having a narrow band filter has the advantage that it can block out the majority of ambient light. Because the emitted fluorescent light is often weak, ambient light, if not blocked, could easily overwhelm the fluorescent light. Alternatively, the reader 100 could be constructed to work in contact mode, that is, a forwardly facing outer bezel of the imaging system 102 is positioned so as to touch the product 12 in order to read the identification pattern 41 or the 2D bar code 50. In the contact mode, the reader body functions to block out ambient light.

Figure 4:
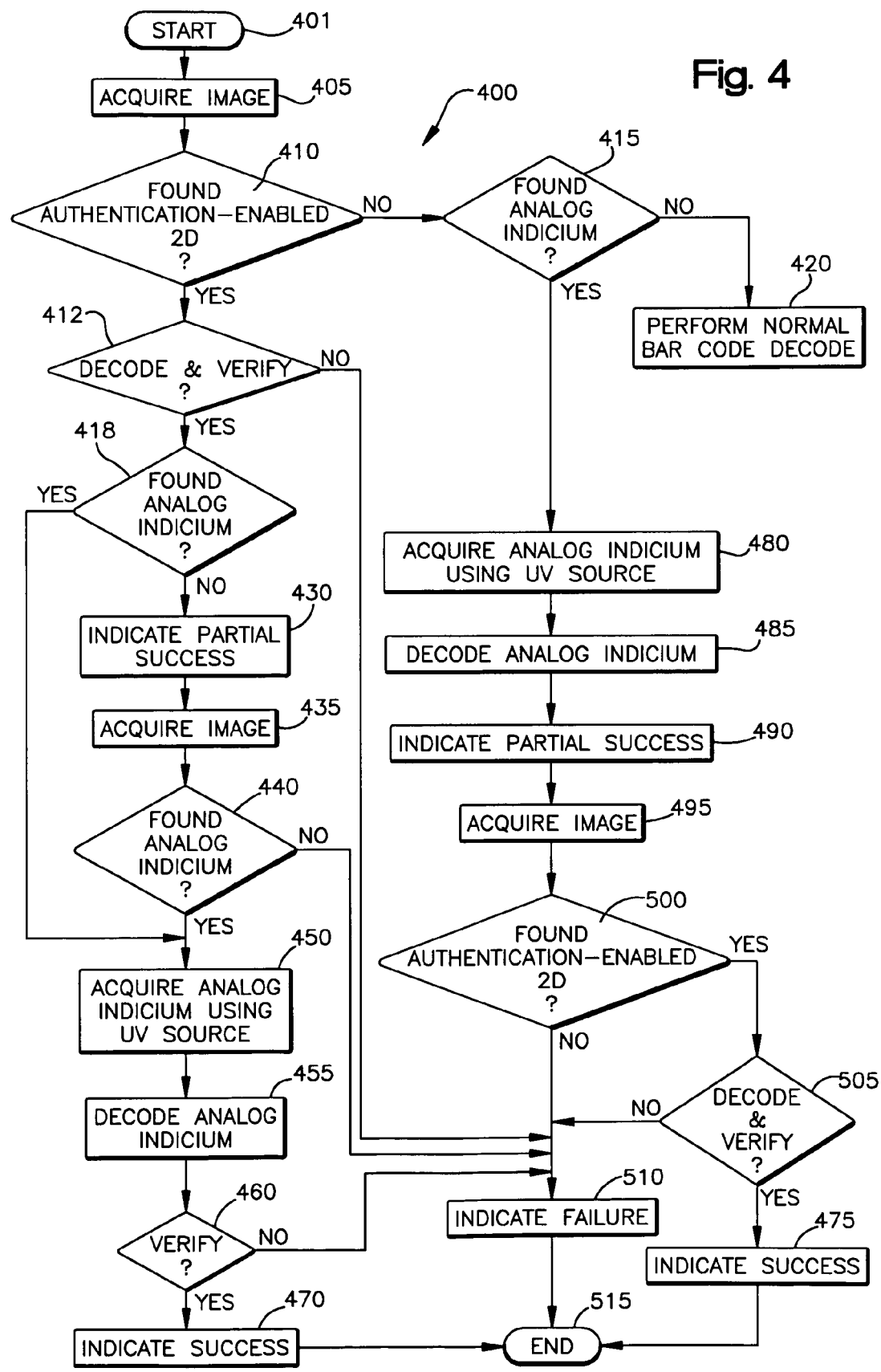
FIG. 4 is a flow chart of a method used by the reader to process analog and digital identification indicia to authenticate the product of FIG. 1.

To process the authentication-enabled analog and digital identifiers 32, 34, the device 100 includes decoding and comparison software 110, 116, 118 that follows the method 400 outlined in FIG. 4. The device 100 can operate in one of several modes, allowing for varied degree of functionality depending on the capabilities of the reader 100 and its level of connectivity. The level of connectivity may be batch, where the device 100 works without a connection to a PC and either performs only the authentication task and provides audio/visual feedback for success or failure, or stores the decoded bar code results in its on-board memory 124 for downloading at a later time. Alternately, the device 100 may be connected to a computer or a wide-area-network. In this way, the decoded results can be instantly transferred, for example, for processing on a linked computer and used for tracking and tracing applications, that is, tracking and tracing the product 12 through its distribution system.

Method of Authentication

Referring now to FIG. 4, a method of authentication is shown generally at 400. At step 405, upon actuation of the reader 100, an image is acquired of the product 12 using the visible illumination source 120. At step 410, the acquired image is analyzed to determine if the authentication-enabled 2D bar code 50 is in the captured image. An authentication-enabled bar code is one that includes a field including the digital identification record 34 and a field including the digital signature 54. If not, the image is analyzed at step 415 to check for the presence of the analog identification indicium 32 indicated by the outline 44.

If neither an authentication enabled bar code 50 nor the analog identification indicium 32 is detected, but the image does include a standard bar code, the image is decoded in the standard fashion at step 420. This branch of the software allows the device 100 to process a regular bar code that is not authentication-enabled.

If the analog identification indicium 32 is found in the image at step 415, the analog identification indicium 32 is acquired again in step 480. The step of reacquisition as indicated in step 480, is needed if the imaging of the identification features 40 of the analog identification indicium 32 requires specialized light, such as UV. The analog identification pattern 41 within the outline 44 is processed in step 485 to decode the product identifier 36. The transformation from identification pattern features 40 to the item identifier 36 is based on one or more attributes or qualities of the features 41, e.g., location of features, size of features, color of features, etc. Predetermined transformation rules are followed to decode or convert the imaged identification pattern 41 to the item identifier 36.

A partial success in decoding the analog identification indicium 32 is indicated at step 490 by, for example, illuminating one but not both of the two authentication green LEDs 112, 114 and/or the sounding of a designated partial decode audio signal through a speaker 113, while the item identifier 36 is stored in the device's memory 124. After the indication of partial success in step 490, signifying the success acquisition of the item identifier 36 from the analog identification indicium 32, the reader 100, upon user activation, acquires another image in step 495.

In step 500, the device 100 attempts to find the 2D bar code 50 in the captured image. If it is not found as expected, it indicates a failure mode in step 510, for example by energizing a red LED 115 and/or the sounding of a designated failure audio signal through the speaker 113, and ends the session at step 515. If the device 100 does find the 2D bar code 50 in the captured image, at step 505, the device decoding software 110 decodes the digital identification record 34 and the digital signature 54 to determine the item identifier 38. The digital signature 54 is decoded to verify the authenticity of the digital identification record 34. The comparison software 118 then compares the two item identifiers 36, 38 to verify the authenticity of the product 12.

If the comparison at step 505 succeeds, that is, the item identifiers 36, 38 are substantially identical, the product 12 is deemed authentic and, at step 475, success is indicated to the operator via illuminating both LEDs 112, 114 and/or the sounding of a designated success audio signal through the speaker 113, and the process ends at step 515. On the other hand, if the comparison at step 505 fails, that is, the item identifiers 36, 38 are not substantially the same, failure is indicated in step 510 by illuminating red LED 115 and/or the sounding of a designated partial decode audio signal through the speaker 113 and the process ends at step 515.

If the authentication enabled 2D bar code 50 is found in the captured image at step 410, then at step 412, the device decoding software 110 decodes the digital identification record 34 to generate the item identifier 38. The digital signature 54 is also decoded and is used to authenticate the digital identification record 34. If the digital identification record 34 cannot be both decoded and verified, then failure is indicated in step 510 (via red LED 115 and/or audio tone) and the process ends at step 515.

If the digital identification record 34 is verified and decoded to generate the item identifier 38, then at step 418, the software searches for the outline 44 of the analog identification indicium 32 in the image. If the identification mark of the analog identification indicium 32 is not found, a partial success is indicated in step 430 (by illuminating one of the two green LEDs 112, 114 and/or sounding an audio tone) to signify the successful acquisition of the item identifier 38. Upon user activation of the device 100, another image is acquired in step 435. In step 440, the new image is searched for the outline 44 of the analog identification indicium 32. If this step fails, failure is indicated at step 510 (illuminate red LED 115) and the session ends at step 515.

If the analog identification outline 44 is found at step 440, control passes to step 450. If the analog identification outline 44 is found at step 418, then again control is passed to step 450. At step 450, an image containing the analog identification indicium 32 is acquired using the UV light source 122. The analog identification pattern 41 is decoded and the item identifier 36 is calculated in step 455. In step 460, the two item identifiers 36, 38 are compared by the comparison software 118 to verify the authenticity of the product 12.

If the verification based on the comparison of the two item identifiers 36, 38 fails, failure is indicated in 510 by illuminating the red LED 115 and/or sounding an audio tone for failure, and session ends at step 515. However, if the verification succeeds, success is indicated in 470 by illuminating both green LEDs 112, 114 and/or sounding an audio tone for successful authentication, and session again ends at step 515.

Those in the art can easily embellish FIG. 4 in accordance to industry standard practices regarding bar code readers. For example, from each user activation step to the point where the reader determines that a code has not been properly acquired in the image in memory, one or more images could be acquired and decode attempted before a failure is declared. On the other hand, if one of these images is decoded successfully, the session (or half-session) is declared successful (or partially successful).

In steps 460 and 505, the item identifiers 34, 36 are verified with a user selectable degree of tolerance or error. The predetermined tolerance or error level may include values for both the number of features found and for their specific values. For example, if the item identifiers 34, 36 represent the x-y coordinates of 25 features in the identification pattern 41, a level of tolerance may be set such that at least 23 of the 25 features need to be identified when imaging the pattern 41. This would account for dust or other contaminants covering or a scratch obliterating a particular feature. Further, with regard to the features identified, a level of tolerance may be set such that the coordinate values must be within +/−10% to be considered a match. For example, if the item identifier 38 included an x-y coordinate value of (205, 489), if the item identifier 36 included a coordinate value of (193, 510) would be considered a match since each of the x and y values are within +/−10%.

The digital identification record 34 is verified in 505 and 412 using the digital signature 54 and the manufacturer's public key. This key should be made available by the manufacturer. The key is usually obtained or verifiable through a trusted certificate agent. The key can be stored in the reader's memory 124 (FIG. 3) or on an associated computer that is accessed by wireless or hard-wired connection. Most readers have sufficient on board memory to cache a number of public keys.

Digital signatures are generally fixed for each manufacturer, with occasional changes in the event that it is retired due to special circumstances such as a merger or breach of security. It is thus generally safe to cache the key for a limited period of time. An expiration time is generally specified with the key, such as one year form the time of issuance or renewal.

The digital signature can be verified alone, without the reading of the analog identification indicium 32. This approach allows a degree of authentication to be provided without requiring hardware modifications for activating specialized features in the analog identification feature.

Alternative embodiments of the security device include using other digital media to record the same information that is recorded in the 2D bar code 50. For example, a magnetic device, or solid-state memory device (such as a memory button or a radio-frequency ID tag (RFID)) could be used.

Hardware Compatibility Flag

The identification features 40 described above often require specialized hardware, such as UV LED/laser 122 (FIG. 1) to stimulate or make visible the feature for analysis and matching with the digitally encoded item identifier 38. The appearance of the identification features 40 may be significantly altered when they are exposed to proper type of light. Applications requiring authentication are widespread and it is possible that users prefer the use of certain identification feature stimuli. For example, some users may prefer that the authentication identifier 30 is only visible under a specific wavelength of UV light while other users may prefer that the authentication identifier 30 be visible in visible light.

A bar code scanner may only have one special stimulus source as part of its hardware. Alternatively, a bar code scanner may have more than one, but less than the complete gamut of, stimulus sources available. If a bar code scanner is used to attempt to read a label with identification features 40 requiring different stimulus hardware than present in the scanner, authentication of the label will fail and the reason for the failure will be unknown. It is preferable for a bar code scanner to be able to recognize a family of authentication identifiers 30, even though it cannot fully authenticate some of them, and alert a user when the proper stimulus hardware is not available.

As discussed above, each authentication identifier 30 includes a border or finder pattern 44. If the finder pattern 44 is printed such that the finder pattern is invisible in visible light, it may make it more difficult for a user to direct the scanner toward the proper area of the label to process an authentication identifier 30.

Figure 5A:
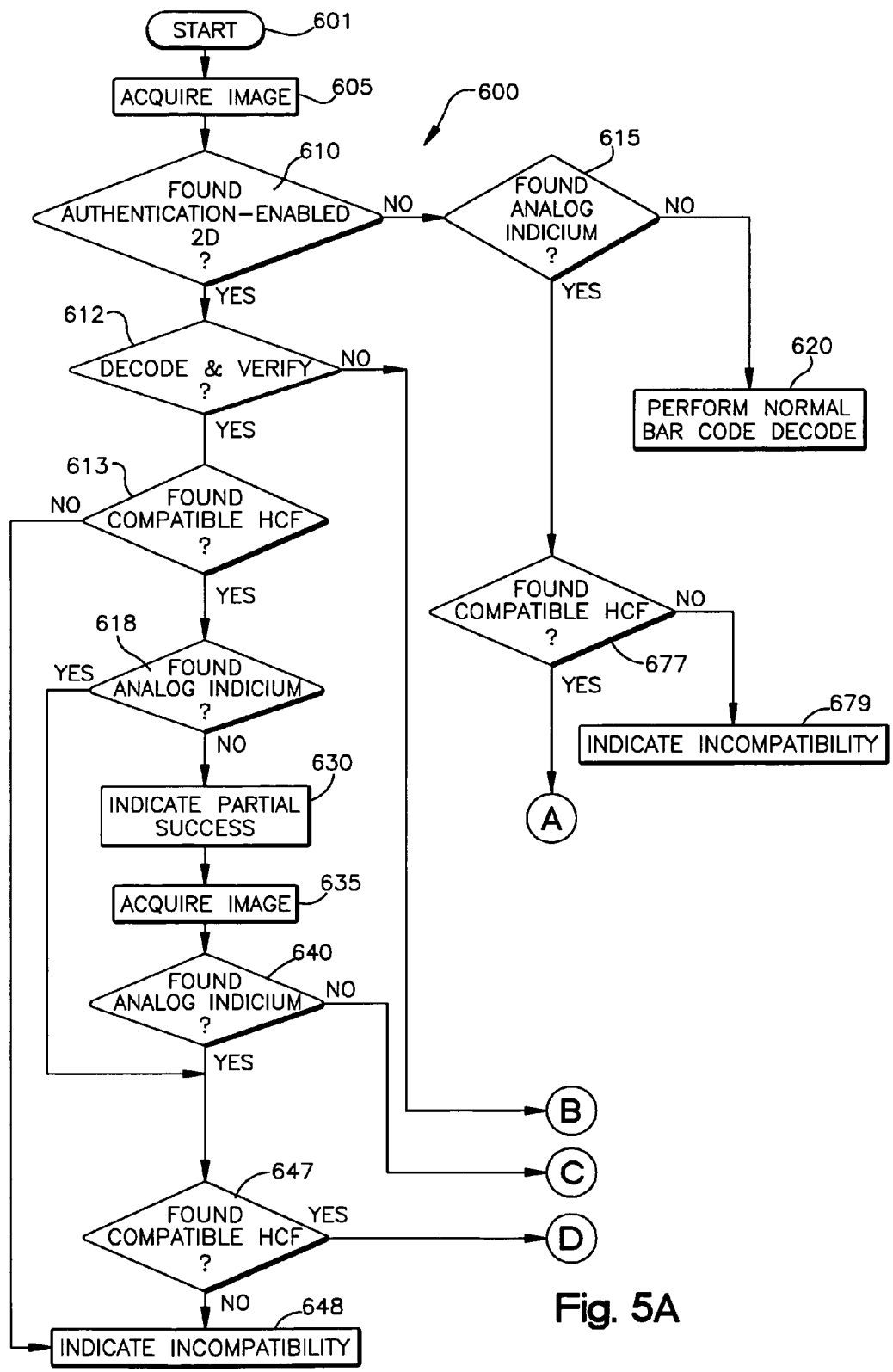
FIG. 5 is a flow chart of a method used by the reader to process analog or digital identification indicia that include a hardware compatibility flag in accordance with an embodiment of the present invention.
Figure 5B:
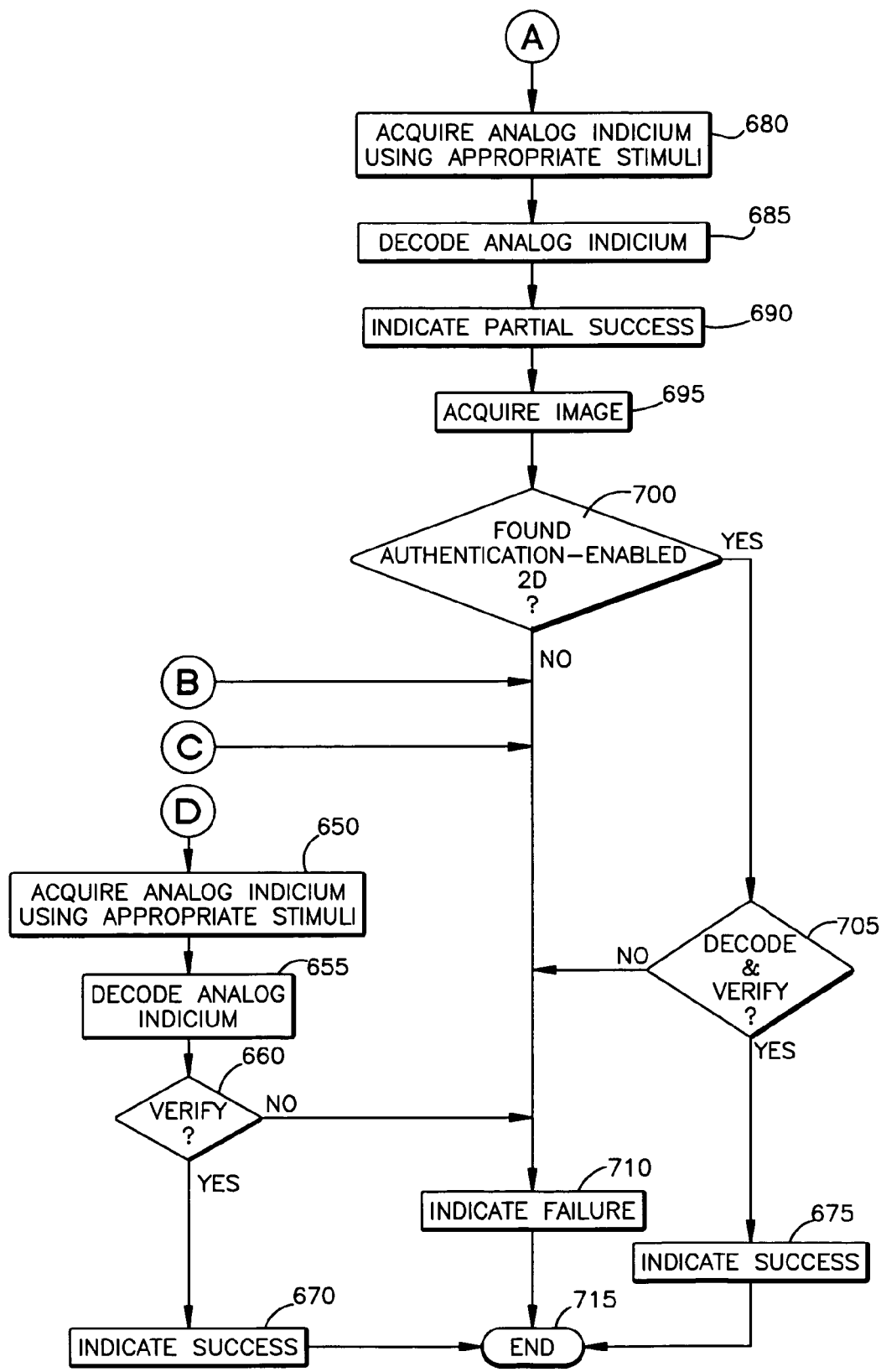

FIGS. 5 and 6 illustrate the use of a hardware compatibility flag that can be part of either the authentication identifier 30 or the digitally encoded item identifier 38. FIGS. 6A-6D illustrate four different finder patterns 44'-44'''' that incorporate a hardware compatibility flag as part of the top (or other) border of the finder pattern. The common features of this family of finder patterns is that they include the same size and overall shape, and the fact that they are all made with connected straight-line segments. Such a family of finder patterns can easily be found by software designed to find their commonalties, and can also distinguish between these different versions. Each particular finder pattern could identify a different wavelength of light that must be used to illuminate the identification features 40 located within the finder pattern. The finder pattern is visible in broad-spectrum visible light, so even though the features encoded may not be detectable when an incompatible scanner is used to scan the authentication identifier 30, the scanner can now recognize this incompatibility.

The finder pattern 44 may be printed in two or more types of ink, one that is visible in visible light and others that are visible in UV light. In this way, the finder pattern can be detected under both the normal light source and the alternative specialized source. The two types of ink may present different optical characteristics to the camera as well. For example, the ink that is visible under visible light may be light absorbing, thus presenting the finder pattern 44 as features darker than the background, while the ink that is visible under UV illumination may be fluorescent, such that the finder pattern 44 is observed as brighter features than the background.

An alternative to providing a hardware compatibility flag that is part of the authentication identifier 30 is to encode the hardware compatibility flag into the digitally encoded item identifier 38. One such embodiment is shown in FIG. 2, where the hardware compatibility flag 35 is part of the 2 dimensional bar code 50. It is also possible that both means of encoding the hardware compatibility flag can be used on the same label, thereby enabling the scanner to detect hardware incompatibility when either part of the authentication mark is read.

Referring now to FIG. 5, a flow chart outlines a method 600 of processing a label that includes a bar code with an authentication enabled scanner. The method 600 follows the method 400 that was already discussed in detail in conjunction with FIG. 4, so only differences between the two will be summarized here. The authentication enabled scanner acquires the target image and whenever it is determined that an analog authentication indicium is present (615, 618), the hardware compatibility flag (HCF) is checked at 677 and 647. As discussed above, when it is part of the analog indicium, the hardware compatibility flag can be a specialized finder pattern such as that shown in FIGS. 6A-6D. If at 647 and 677 it is determined that the proper hardware is present to provide the stimuli indicated by the hardware compatibility flag, the normal process is followed as discussed relating to FIG. 4. If the hardware is not present, then at 648 and 679, the user is alerted that the hardware is not compatible and the decode session ends. In the case where the hardware compatibility flag is part of the 2D bar code as shown in FIG. 2, the hardware compatibility flag is analyzed at 613 and if it is determined that the proper hardware is present, the normal process is followed as discussed in FIG. 4. If the hardware is not present, then at 648, the user is alerted that the hardware is not compatible and the decode session ends. In this way, the user is made aware of the hardware issue and any goods that cannot be authenticated are not processed.

Blur Analysis Target

The above described indicia are often scanned with handheld scanners (including those incorporated as parts of handheld mobile computers) similar to existing 2-D imaging scanners which tend to provide little or no focus adjustment or limited step focus adjustment. In these devices, the working range with respect to processing digital portions of the indicia that are encoded in the 2-D barcode portion is usually satisfactory. This is because the content of the 2-D barcode can generally be decoded correctly and exactly in the presence of substantial blur, such as the blur caused by mis-focus.

However, the analog identification indicium portion of the authentication indicia that bears the analog signature may change significantly when imaged out-of focus, because there is no encoding in the analog identification indicium as there is in the 2-D barcode. This means that the authentication device, such as a scanner, may have dissimilar working ranges as between the analog identification indicium and the 2-D barcode portion of the authentication indicia. Furthermore, the same analog identification indicium may generate different analog signatures at different focuses, as the blur from mis-focus tends to reduce each feature's contrast with its background and expand its size.

The analog identification indicium includes at least two important components: analog identification features and an identifier including an outline or border and possibly one or more orientation marks. The analog identification features are likely embedded in the base material (such as paper or plastic), and may have varying size, color, and edge sharpness. The indicium's identifier, however, can generally be created with a high-quality printing process, and can therefore be expected to have consistent and high contrast.

Generally, any image of the analog identification indicium acquired by an authentication scanner is blurred. This is especially true of scanner designs that avoid auto-focusing in order to achieve fast reaction time. The blur is more significant when the image is taken farther away from the focus of the camera (or the object plane conjugate to the camera's sensor. For simplicity it can be assumed that the blur is uniform within each image. That is, the image can be assumed to be an ideal image convolved with a 2-D blur kernel. Furthermore, in practice, it can be assumed that the 2-D blur kernel is rotationally symmetrical. Mathematically, the relationship between the output image (Fo), the blur kernel (k), and the input image ($F_i$) can be expressed as:

$$F_o(x,y) = \int\int k(x-x', y-y') F_i(x', y') dx' dy'$$

The rotational symmetry of the blur kernel k can be expressed as:

$$k(x,y) = k_r(r)$$

$$\text{where } r = \sqrt{x^2 + y^2}$$

The analog signature record contained in the 2-D barcode portion of the authentication indicium, however, describes the analog signature acquired in ideal conditions, or one that is processed to remove blur. To permit high-confidence comparisons of the analog signature derived from the image with the analog signature record in the 2-D barcode, either the analog signature is deblurred first, or the template, which is an image created according to the analog signature record, is blurred first, before the two are compared.

Any known deblurring algorithm can be employed on an image, with the goal of achieving high contrast and sharp edges for the identifier. The deblurring process, when it has finished deblurring the target 160 would have also made the analog identification features as sharp as they can be. This process is generally performed iteratively, until a predetermined criterion is met. For example, a predetermined number of iterations can be performed. Alternatively or additionally, the deblurring process can be terminated when the incremental change in the image is less than a predetermined value.

Another method of processing such an image is through quantizing the image into very few levels such as two to four levels. When two levels are used the processing is commonly referred to as binarizing, and the resultant image as a binary image. This process reduces the differences between the color changes that are brought about by the blurring. Further processing may be used to reduce the size variations caused by the blurring. For example, the feature size information can be completely ignored when doing the comparison. The use of a blur target, as described below, can allow blur in the analog identification indicium to be compensated for during processing without the need to iteratively deblur the analog identification indicium.

Figure 7A:
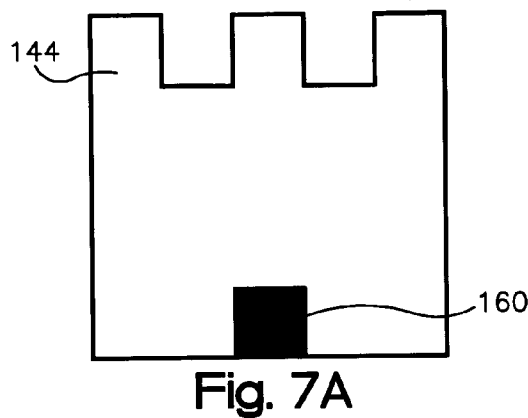
FIGS. 7A-7B show an analog identification indicium that includes a blur analysis target according to an embodiment of the present invention.
Figure 8:
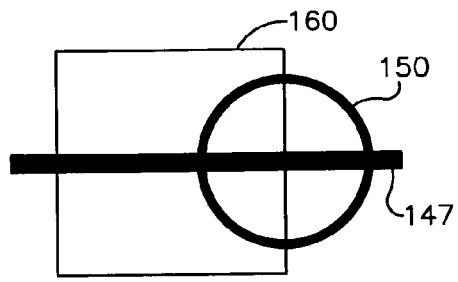
FIG. 8 shows the relationship between a blur analysis target, a blur kernel, and a scanline.

FIG. 7A shows an analog identification indicium 144 that includes a blur analysis target 160. This blur analysis target 160 aids in the construction a deblurring filter, so that such a filter does not need to be built or used iteratively. The target 160 in the described embodiment is a solid square with high contrast, however other suitable shapes and contrasts will be apparent to one of skill in the art. The size of the square should be sufficiently large to help in identifying the amount of blur. If the blur analysis target is sufficiently large, when an analog identification indicium with such a target is imaged, for a reasonably large range of object distances the effective size of the blur kernel is smaller than the target such as shown in FIG. 8 in which the blur kernel is designated as 150 and a scanline as 147. In this range it is expected that the blur would not substantially change the color of either the center region of the blur analysis target, or the background in general. From this assumption, the expected black level and white levels that correspond to the center of the blur analysis target as well as any other region that does not include the border of the identifier can be deduced.

Figure 7B:
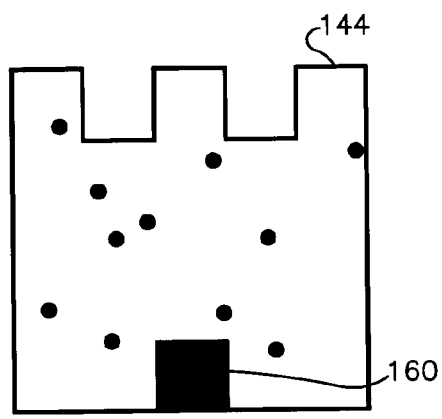

After the analog identification indicium is found, it is rectified in memory such that the perspective distortion is removed, its size normalized to a standard size, and its orientation aligned with the major axes of the image as shown in FIG. 7B. The unevenness in illumination is removed to help to condition the image for further processing.

Assuming that the effective size of the blur kernel is smaller than the blur analysis target, a scanline passing near the center of an edge of the blur analysis target 160 and along a major axis (FIG. 8) is influenced by the 1-D projection of the blur kernel 150. For the scanline 147 the blur kernel does not touch any portion of the unblurred image where the colors along the vertical direction (y) is different. Mathematically:

$$F_o = \int k_1(x-x')F_i(x')dx'$$

where:

$$k_1(x) = \int k(x,y)dy$$

Because of the rotational symmetry of the blur kernel, this last function, hereafter called the line-spread function, is the same as the Radon Transform for any direction. Once the line-spread function is found, inverse Radon Transform can be used to find the blur kernel (or point-spread function). This is usually performed numerically.

In the image, the blur analysis target has an unknown size. This is partly because the image may be captured with variable distance between the scanner and the indicium, and partly because the indicium may be of somewhat variable size, if it is to be produced by different manufacturers with different printing processes. With the known shape of the blur analysis target, and the assumption that the blur kernel is symmetrical, the location of the ideal edge can be identified with good precision without requiring accurate knowledge of the exact physical dimension of the target or even the ratio of the sizes of the blur analysis target versus the indicium.

Figure 9A:
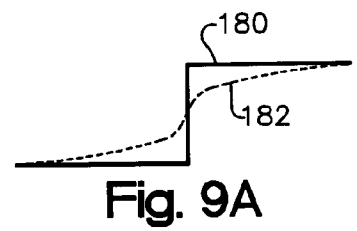
FIGS. 9A-9B are curves representing a single linescan over one edge of a blur analysis target.

FIG. 9A is a curve representing a single linescan over one edge of the blur analysis target. The blurred waveform 182 is shown as the dashed line, while the ideal waveform 180 is shown as the solid line. The ideal waveform is formed by analyzing the blurred waveform, and with the assumption of a rotationally symmetrical blur kernel. The high and low levels of the ideal waveform are determined from an average of the background and the center of the blur analysis target. For the purposes of this description it is assumed that the blur analysis target is darker and therefore is associated with the lower level, but the converse can be the case as well. The midpoint level of the blurred waveform may be used to determine the location of the edge, where the transition between the high and low levels occurs. Alternatively, the transition point can be found as the point where the area integrals between the two waveforms on either side are the same. Other methods, such as finding the inflection point in which the second-order derivative is zero, can also be used to determine the edge location.

The line-spread function can be found by differentiating the blurred waveform. Referring to the waveforms shown in FIG. 9A in which the ideal waveform 180 is a step function, the line-spread function is found as:

$$k_1(x) = \frac{1}{c} \frac{dw(x)}{dx}$$

where w(x) is the blurred waveform, and c is the height (or the difference between the two levels) of the step function as determined above. As described earlier, from the line-spread function the point-spread function (the blur kernel) can be derived using the reverse Radon Transform.

Figure 9B:

It is anticipated that one type of noise will come from any analog identification features that may be present near the edge of the blur analysis target. These features can be identified from either comparisons between different scan lines, or from the asymmetry or jaggedness in the blurred waveform 183 that the features cause as shown in FIG. 9B. Once detected as such, the blurred waveform can be repaired.

The inclusion of the blur analysis target can also help to detect when the blur is excessive. As already established, the blur analysis target is selected to be larger than the expected blur kernel. This size helps to ensure that its center region is generally not blurred, and therefore can be used to select one of the two levels of the ideal waveform, for all scan lines passing through it. When the blur is excessive, the center region of this blur analysis target would become blurred, and this can be easily detected. A predetermined number of pixels in the center of the blur analysis target can be examined for each image. If these pixels possess substantially the same values, the amount of blur is determined to be not excessive. The level of the ideal waveform can be determined from the average of these pixels. On the other hand, if these pixels possess substantially different values, it can be inferred that the amount of blur is excessive, and further processing is avoided, to save time and avoid a false authentication failure. An excessive blur alert can also be triggered to prompt the operator to take corrective action, such as bringing the scanner into its working range.

Once the blur kernel is found, the working range of the scanner can be extended by compensating for the blur. The image can be deblurred before extracting the analog signature. The extracted signature is then compared with the analog signature record found in the digital portion of the authentication indicium. Alternatively, a template created from the analog signature record can be blurred with the blur kernel, and this filtered template can then be compared with the acquired image.

Figure 10:
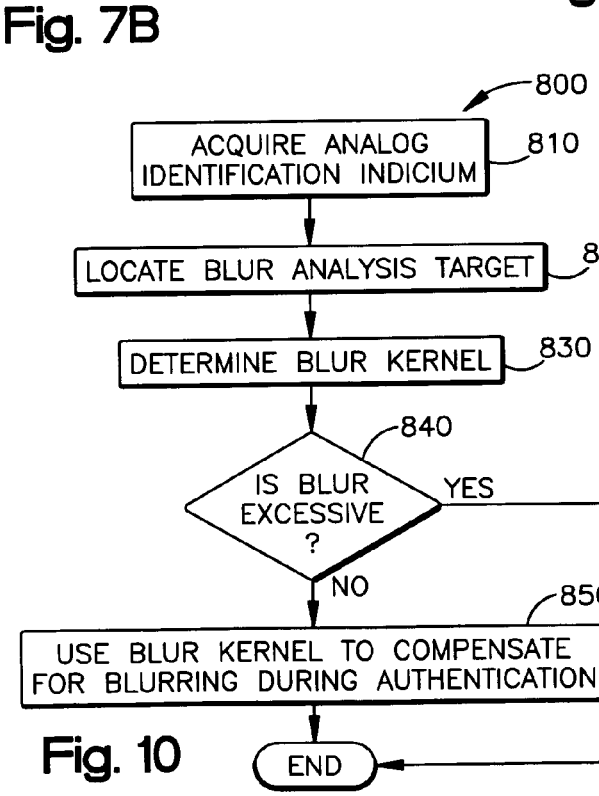
FIG. 10 is a flowchart outlining one method of processing a blur analysis target according to the present invention.

FIG. 10 is a flowchart depicting a generalized method 800 for authenticating a product while compensating for blur. At 810 the analog identification indicium is acquired and at 820 the blur analysis target is located. The blur kernel is determined at 830 and if the amount of blur is excessive at 840 the method ends. If the amount blur is not excessive, the blur kernel is used to compensate for blurring during processing of the analog identification indicium and/or comparing the analog signature with the digitally encoded signature record.

To deblur the image prior to extracting the analog signature, know processes can be used that utilize the blur kernel. Since the blur kernel necessarily decays on the periphery, which when inverted for deblurring cause the noise effects to be magnified, compensation measures, such as using a Weiner filter instead of a simple inverse filter, should be employed.

To blur a template created from the stored analog signature record prior to comparison with the acquired image, after the finder pattern of the analog signature is located the image is stored for later processing if the digital portion of the authentication indicium has not already been decoded. Once the digital portion of the authentication indicium has been decoded, a template is created that is an idealized image the includes the analog identification features as described in the analog signature record and the implied analog indicium's finder pattern. This template is then blurred, and the result is used for comparison with the acquired image.

It can be seen from the foregoing description that compensating for blur in the analog identification indicium can improve the range of an authentication device. Although the invention has been described with a certain degree of particularity, it should be understood that various changes can be made by those skilled in the art without departing from the spirit or scope of the invention as hereinafter claimed.

We claim:

1. A method of identifying or authenticating a product, the steps of the method comprising:
    providing an analog identification indicium comprising a random pattern of identification features within an area of interest on the product, the random pattern of identification features corresponding to an item identifier;
    providing an encoded digital identification record, the encoded digital identification record including an encoded digital version of the item identifier;
    capturing an image of the analog identification indicium;
    compensating for blurring of the image of the analog identification indicium;
    determining a first item identifier from an image of the analog identification indicium
    determining a second item identifier from the digital identification record; and
    determining the authenticity of the product by comparing the first item identifier with the second item identifier.

2. The method of claim 1 wherein the blurring of the analog identification indicium image is compensated for by quantizing the analog identification indicium into a few levels of contrast and then determining an image item identifier from the quantized version of the analog identification indicium image.

3. The method of claim 1 wherein the blurring of the analog identification indicium image is compensated for by binarizing the image of the analog identification indicium and then determining an image item identifier from the binarized version of the analog identification indicium image.

4. The method of claim 1 wherein the blurring of the analog identification indicium image is compensated for by constructing a deblurring filter, applying the filter to the image of the analog identification indicium, and then determining an image item identifier from the filtered version of the analog identification indicium image.

5. The method of claim 1 comprising determining a level of blurring of the image of the analog identification indicium and compensating for blurring of the analog identification indicium based on the determined level of blurring.

6. The method of claim 5 wherein the analog identification indicium includes a blur analysis target and wherein the level of blurring of the image of the analog identification indicium is determined by analyzing the blur analysis target to construct a blur kernel that can be used to compensate for blurring of the image of the analog identification indicium.

7. The method of claim 6 wherein the blur analysis target is a square having high contrast.

8. The method of claim 6 wherein the blur kernel is constructed by:
    forming an idealized step waveform representing light reflected back from a scan of an unblurred blur analysis target edge wherein the idealized step waveform comprises a first level corresponding to a level of contrast of a background of the analog identification indicium and a second level corresponding to the determined level of contrast of the center location of the blur analysis target;
    scanning at least one line of pixels through the center the blur analysis target and forming a blurred step waveform representing the light reflected back from the line;
    calculating a one-dimensional line-spread function utilizing the level differential between the idealized step waveform and a derivative of the blurred step waveform as a function of position; and
    transforming the line-spread function into a two-dimensional blur kernel based on an assumption that the blur kernel is rotationally symmetrical.

9. The method of claim 6 wherein the blurring of the analog identification indicium is compensated for by inverting the blur kernel and applying the inverted blur kernel to the image of the analog identification indicium.

10. The method of claim 6 wherein the blurring of the image of the analog identification indicium is compensated for by constructing an analog identification indicium template from the encoded digital identification record, blurring the analog identification indicium template, and determining an item identifier derived from the blurred analog identification indicium template for comparison with the image item identifier.

11. The method of claim 6 wherein the level of blurring is determined by scanning a set of pixels at a center region of the blur analysis target and determining an amount of variation in the contrast of the pixels in the set of pixels.

12. The method of claim 5 further comprising outputting an excessive blur alert when the determined level of blurring exceeds a predetermined threshold.

13. The method of claim 5 comprising inhibiting further processing when the determined level of blurring exceeds a predetermined threshold.

14. The method of claim 1 wherein the item identifier corresponding to the random pattern of identification features is based on a selected one attribute of a set of attributes of the random pattern of identification features, the set of attributes including: location of identification features; size of identification features; and color of identification features.

15. A system for authenticating a product comprising:
    the product including:
        an analog identification indicium comprising a random pattern of identification features within an area of interest, the random pattern of identification features corresponding to an item identifier;
        an encoded digital identification record associated with the product, the encoded digital identification record including an encoded digital version of the item identifier; and
    an imaging device including an imaging system for generating an image of the analog identification indicium and the digital identifier;
    the imaging device further including circuitry for:
        capturing an image of the analog identification indicium;
        compensating for blurring of the image of the analog identification indicium;
        determining a first item identifier from an image of the analog identification indicium;
        determining a second item identifier from the digital identification record; and
        determining the authenticity of the product by comparing the first item identifier with the second item identifier.

16. The system of claim 15 wherein the analog identification indicium comprises a blur analysis target that is captured as part of the image of the analog identification indicium and utilized by the circuitry to compensate for blurring of the image of the analog identification indicium.

17. Computer readable media having computer-executable instructions stored thereon and executed on a computer for identifying or authenticating a product comprising:
    an analog identification indicium comprising a random pattern of identification features within an area of interest on the product, the random pattern of identification features corresponding to an item identifier;

an encoded digital identification record marked on the product, the encoded digital identification record including an encoded digital version of the item identifier, the instructions comprising:

capturing an image of the analog identification indicium;

compensating for blurring of the image of the analog identification indicium;

determining a first item identifier from an image of the analog identification indicium;

determining a second item identifier from the digital identification record; and determining the authenticity of the product by comparing the first item identifier with the second item identifier.

18. The computer readable media of claim 17 wherein the instructions for compensating for the blurring of the analog identification indicium image comprise quantizing the analog identification indicium image into a few levels of contrast and then determining an image item identifier from the quantized version of the analog identification indicium image.

19. The computer readable media of claim 17 wherein the instructions for compensating for the blurring of the analog identification indicium image comprise binarizing the image of the analog identification indicium and then determining an image item identifier from the binarized version of the analog identification indicium image.

20. The computer readable media of claim 17 wherein the instructions for compensating for the blurring of the analog identification indicium image comprise constructing a deblurring filter, applying the filter to the image of the analog identification indicium, and then determining an image item identifier from the filtered version of the analog identification indicium image.

21. The computer readable media of claim 17 wherein the analog identification indicium includes a blur analysis target and including instructions for analyzing the blur analysis target to construct a blur kernel that can be used to compensate for blurring of the image of the analog identification indicium.

22. The computer readable media of claim 21 wherein the instructions for constructing the blur kernel comprise:

forming an idealized step waveform representing light reflected back from a scan of an unblurred blur analysis target edge wherein the idealized step waveform comprises a first level corresponding to a level of contrast of a background of the analog identification indicium and a second level corresponding to the determined level of contrast of the center location of the blur analysis target;

scanning at least one line of pixels through the center the blur analysis target and forming a blurred step waveform representing the light reflected back from the line;

calculating a one-dimensional line-spread function utilizing the level differential between the idealized step waveform and a derivative of the blurred step waveform as a function of position; and transforming the line-spread function into a two-dimensional blur kernel based on an assumption that the blur kernel is rotationally symmetrical.

23. The computer readable media of claim 21 wherein the instructions for compensating for blurring of the analog identification indicium comprise inverting the blur kernel and applying the inverted blur kernel to the image of the analog identification indicium.

24. The computer readable media of claim 21 wherein the instructions for compensating for blurring of the analog identification indicium comprise constructing an analog identification indicium template from the encoded digital identification record, blurring the analog identification indicium template, and determining an item identifier from the blurred analog identification indicium template for comparison with the image item identifier.

25. The computer readable medium of claim 17 wherein the instructions further comprise outputting an excessive blur alert when a determined level of blurring exceeds a predetermined threshold.

26. The computer readable medium of claim 25 wherein the level of blurring is determined by scanning a set of pixels at a center region of the blur analysis target and determining an amount of variation in the contrast of the pixels in the set of pixels.

27. The computer readable medium of claim 17 wherein the instructions further comprise inhibiting further processing when a determined level of blurring exceeds a predetermined threshold.

28. A combination of a product and an apparatus for identifying or authenticating the product, the combination comprising:

the product including:
an analog identification indicium comprising a random pattern of identification features within an area of interest on the product, the random pattern of identification features corresponding to an item identifier; and an encoded digital identification record associated with the product, the encoded digital identification record including an encoded digital version of the item identifier; and the apparatus including:
means for capturing an image of the analog identification indicium;

means for compensating for blurring of the image of the analog identification indicium;

means for determining a first item identifier from an image of the analog identification indicium;

means for determining a second item identifier from the digital identification record; and means for determining the authenticity of the product by comparing the first item identifier with the second item identifier.

29. The apparatus of claim 28 wherein the analog identification indicium includes a blur analysis target and wherein the apparatus comprises means for constructing a blur kernel that can be used to compensate for blurring of the image of the analog identification indicium.

30. The apparatus of claim 29 wherein the means for constructing a blur kernel comprises:

means for forming an idealized step waveform representing light reflected back from a scan of an unblurred blur analysis target edge wherein the idealized step waveform comprises a first level corresponding to a level of contrast of a background of the analog identification indicium and a second level corresponding to the determined level of contrast of the center location of the blur analysis target;

means for scanning at least one line of pixels through the center the blur analysis target and forming a blurred step waveform representing the light reflected back from the line;

means for calculating a one-dimensional line-spread function utilizing the level differential between the idealized step waveform and a derivative of the blurred step waveform as a function of position; and means for transforming the line-spread function into a two-dimensional blur kernel based on an assumption that the blur kernel is rotationally symmetrical.

31. The apparatus of claim 29 wherein the means for compensating for blurring of the image of the analog identification indicium inverts the blur kernel and applies it to the image of the analog identification indicium.

32. The apparatus of claim 28 wherein the means for compensating for blurring of the image of the analog identification indicium comprises means for constructing an analog identification indicium template from the encoded digital identification record, means for blurring the analog identification indicium template, and means for determining an item identifier from the blurred analog identification indicium template for comparison with the image item identifier.

33. The apparatus of claim 28 further comprising means for outputting an excessive blur alert when the determined level of blurring exceeds a predetermined threshold.

34. The apparatus of claim 33 wherein the means for determining a level of blurring scans a set of pixels at a center region of the blur analysis target and determines an amount of variation in the contrast of the pixels in the set of pixels.

35. The apparatus of claim 28 further comprising means for inhibiting further processing when the determined level of blurring exceeds a predetermined threshold.

\* \* \* \* \*